United States Patent
Yasunori et al.

(10) Patent No.: US 7,970,515 B2
(45) Date of Patent: Jun. 28, 2011

(54) VEHICLE ELECTRONIC CONTROL UNIT

(75) Inventors: Hiromichi Yasunori, Nagoya (JP); Masaki Mori, Kariya (JP); Morio Sakai, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 349 days.

(21) Appl. No.: 11/630,961

(22) PCT Filed: Jul. 26, 2005

(86) PCT No.: PCT/JP2005/013642
§ 371 (c)(1),
(2), (4) Date: Dec. 28, 2006

(87) PCT Pub. No.: WO2006/011476
PCT Pub. Date: Feb. 2, 2006

(65) Prior Publication Data
US 2007/0265747 A1 Nov. 15, 2007

(30) Foreign Application Priority Data
Jul. 28, 2004 (JP) .................. 2004-220885

(51) Int. Cl.
*B60R 22/00* (2006.01)
(52) U.S. Cl. ............. 701/45; 701/36; 340/667; 180/268
(58) Field of Classification Search .............. 701/36, 701/45; 340/457.1, 667; 180/286; 280/802
See application file for complete search history.

(56) References Cited

U.S. PATENT DOCUMENTS

| | | | | |
|---|---|---|---|---|
| 4,698,808 A | * | 10/1987 | Ishii | 714/722 |
| 5,670,934 A | * | 9/1997 | Ina et al. | 340/426.35 |
| 5,917,249 A | * | 6/1999 | Kon'i et al. | |
| 6,257,363 B1 | * | 7/2001 | Midorikawa et al. | 180/268 |
| 7,650,515 B2 | * | 1/2010 | Ito et al. | 713/193 |
| 2003/0159027 A1 | * | 8/2003 | Sekiya et al. | |
| 2003/0216886 A1 | * | 11/2003 | Hattori et al. | |
| 2004/0075569 A1 | * | 4/2004 | Ohtaka | 340/667 |

FOREIGN PATENT DOCUMENTS

| | | | |
|---|---|---|---|
| JP | 10-122106 | * | 5/1998 |
| JP | 3308542 B2 | * | 5/2002 |
| JP | 2002-328849 | * | 11/2002 |
| JP | 2003-70175 | * | 3/2003 |
| JP | 2003-308307 | * | 10/2003 |
| JP | 2003-329508 | * | 11/2003 |
| JP | 2004-125594 | * | 4/2004 |

OTHER PUBLICATIONS

International Search Report dated Oct. 20, 2005.*

* cited by examiner

*Primary Examiner* — Mark Hellner
*Assistant Examiner* — Helal A Algahaim
(74) *Attorney, Agent, or Firm* — Buchanan Ingersoll & Rooney PC

(57) ABSTRACT

Power is supplied to an ECU (20) from an on-vehicle battery (41). When an ignition switch (42) is switched from the OFF state to the ON state upon vehicle engine start, the ECU (20) is switched from the power saving mode to the normal mode and a CPU (31) executes initial processing. Moreover, when a user puts on a seat belt and a seat belt switch (44) is switched from the ON state to the OFF state, the ECU (20) is switched from the power saving mode to the normal mode and the CPU (31) executes the initial processing. Thus, the initial processing is executed at a comparatively short interval and it is possible to improve the reliability of the CPU (31).

20 Claims, 3 Drawing Sheets

VEHICLE ELECTRONIC CONTROL UNIT

FIELD OF THE INVENTION

The present invention relates to a vehicle electronic control unit supplied with power from an on-vehicle battery.

BACKGROUND OF THE INVENTION

Patent publication 1 discloses a vehicle electronic control unit (hereinafter referred to as the ECU) for maintaining an operating state even when the ignition switch is inactivated by directly being supplied with power from an on-vehicle battery. The vehicle ECU includes a central processing unit (hereinafter referred to as the CPU).

In such a vehicle ECU, the CPU must undergo an initial process to check the operation of the CPU. However, in the vehicle ECU of patent publication 1, the initial process of the CPU is performed only when dismounting and mounting the on-vehicle battery. The dismounting and mounting of the on-vehicle battery is not frequently performed. Therefore, the initial process may not be performed over a long period of time if the initial process of the CPU is performed only when the on-vehicle battery is mounted or dismounted.

[Patent Publication 1]: Japanese Laid-Open Patent Publication No. 2003-70175

SUMMARY OF THE INVENTION

The present invention provides a vehicle electronic control unit, which is supplied with power supply from an on-vehicle battery, increasing the frequency the initial process is performed and improving the reliability of the central processing unit.

To achieve the above object, the present invention provides a vehicle electronic control unit including a central processing unit and directly supplied with power from a battery mounted on a vehicle. The electronic control unit performs an initial process on the central processing unit to check the operation of the central processing unit in response to at least one of a change in an ignition switch of the vehicle from an OFF state to an ON state and a change from an ON state to an OFF state.

Accordingly, the present invention performs the initial process in relatively short intervals and improves the reliability of the central processing unit.

The present invention also provides a vehicle electronic control unit including a central processing unit and directly supplied with power from a battery mounted on a vehicle. The vehicle electronic control unit has operation modes including a normal mode and a power saving mode. The central processing unit undergoes an initial process to check the operation of the central processing unit in response to a change from the power saving mode to the normal mode.

The present invention further provides a vehicle electronic control unit including a central processing unit and supplied with power from a battery mounted on a vehicle. The vehicle electronic control unit includes a first switch changing states when starting an engine of the vehicle, and a second switch detecting fastening and unfastening of a seat belt in the vehicle. The central processing unit undergoes an initial process in response to outputs from the first switch and the second switch.

Additionally, the present invention provides a vehicle electronic control unit including a central processing unit, supplied with power from an external power supply, and operated in an operation mode including a power saving mode for suppressing power consumption of the central processing unit. In the vehicle electronic control unit, the central processing unit is initialized when an ignition state of the vehicle or a fastening state of a seat belt in the vehicle changes during operation in the power saving mode.

DETAILED DESCRIPTION OF THE PREFERRED EMBODIMENTS

One embodiment of the present invention will now be described with reference to the drawings.

Figure 1:
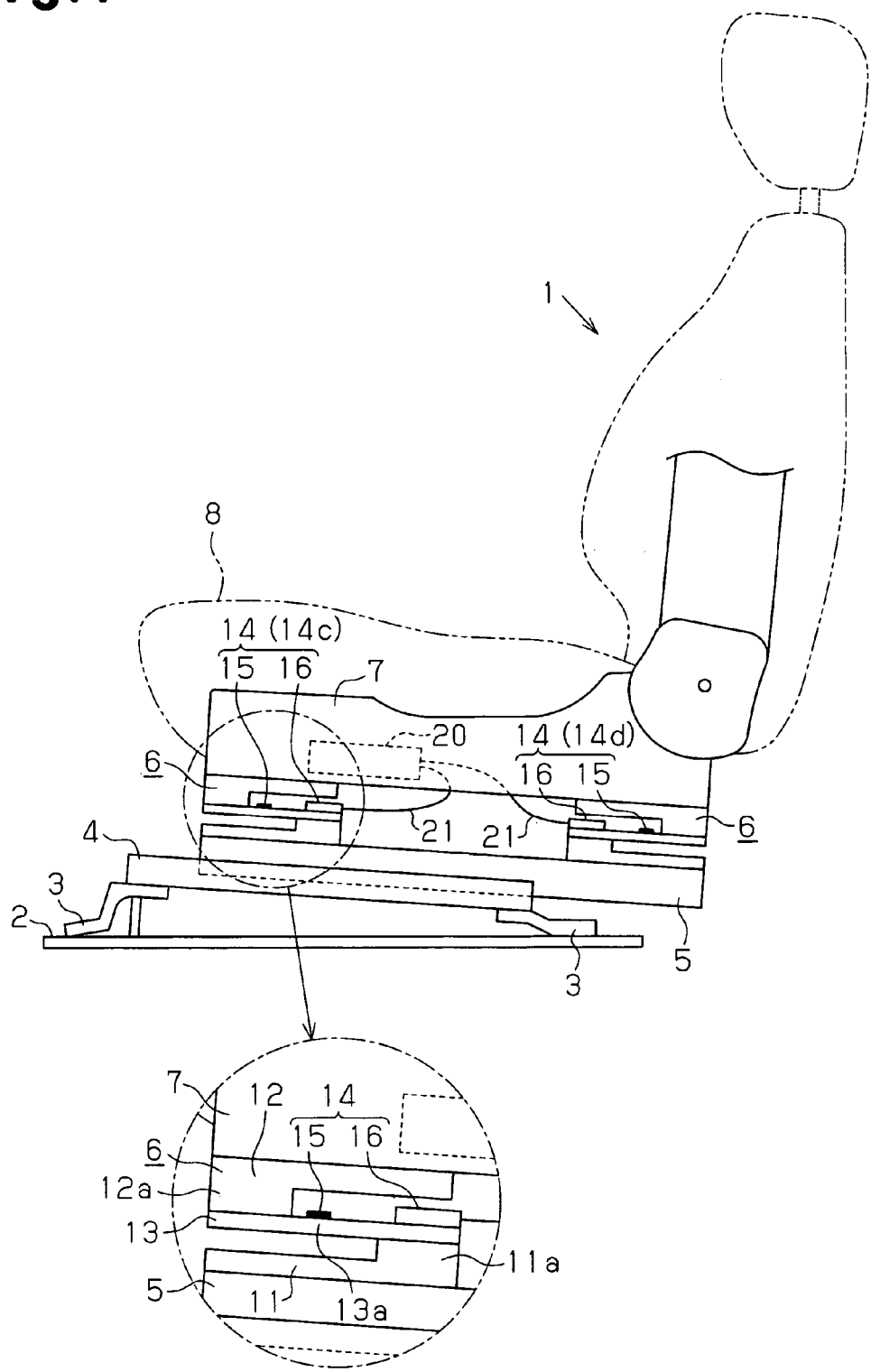
FIG. 1 is a side view showing a frame structure for a vehicle seat in which an ECU according to one embodiment of the present invention is arranged.

FIG. 1 shows the frame structure of a seat 1 serving as a passenger seat in a vehicle such as an automobile. The frame structure shown in FIG. 1 is one of two frame structures arranged in pairs in the widthwise direction (direction orthogonal to the plane of FIG. 1) of the seat 1. FIG. 1 shows the frame structure arranged on the left side when facing toward the front of the vehicle. The frame structure arranged on the right side when facing the front of the vehicle has the same structure as the frame structure on the left side shown in FIG. 1. Thus, the following description is made for the frame structure on the left side.

As shown in FIG. 1, the frame structure of the seat 1 includes a support frame 2 fixed to the vehicle floor (not shown) so as to extend in the forward direction of the vehicle. Front and rear brackets 3 are fastened to the upper surface of the support frame 2, and a lower rail 4 is fixed to the brackets 3 so as to extend along the support frame 2. An upper rail 5 is attached to the lower rail 4 in a slidable manner in the forward and rearward directions of the vehicle.

A lower arm 7 is supported on the upper surface of the upper rail 5 by a pair of front and rear sensor units 6 and spaced from the upper rail 5 by a predetermined interval. The lower arm 7 forms the frame structure of a seat cushion 8. Since a pair of front and rear sensor units 6 are also arranged on the frame structure at the right side of the seat 1 in the same manner as the frame structure on the left side, the seat 1 of the present embodiment has a total of four sensor units 6.

As shown in the enlarged view of FIG. 1, each sensor unit 6 includes a first bracket 11, a second bracket 12, a strain producing body 13, and a load sensor 14. The load sensor 14 includes a strain gauge 15 and a signal processing device 16. The first bracket 11 is fixed to the upper surface at the end of the upper rail 5. A support portion 11a projects upward from the basal end (end located inward in the longitudinal direction of the upper rail 5) of the first bracket 11. The support portion 11a has a flat upper surface. The second bracket 12 is fixed to the lower surface at the end of the lower arm 7. A support portion 12a projects downward from the distal end (end located outward in the longitudinal direction of the upper rail 5) of the second bracket 12. The support portion 12a has a flat lower surface. The first and second brackets 11 and 12 are arranged facing upward and downward directions so that the support portions 11a and 12a project alternately.

The strain producing body 13 is formed to be plate-shaped extending along the longitudinal direction of the first and second brackets 11 and 12. One end of the strain producing body 13 is fastened to the upper surface of the support portion 11a, and the other end of the strain producing body 13 is fastened to the lower surface of the support portion 12a. Accordingly, the strain producing body 13 functions as a cantilever, with one end fixed to the support portion 11a as a fixed end to receive the load applied to the lower arm 7 (seat 1) from the other end fixed to the support portion 12a. A flexible portion 13a is defined by at intermediate part of the strain producing body 13 in the longitudinal direction. The strain gauge 15 of the load sensor 14 is adhered to one surface (upper surface in FIG. 1) of the flexible portion 13a. The signal processing device 16 of the load sensor 14 is mounted on the upper surface at the end of the strain producing body 13 that is fixed to the support portion 11a.

The strain producing body 13 bends about the end fixed to the support portion 11a when receiving load in the vertical direction from the support portion 12a of the second bracket 12. The strain gauge 15 is strained by the bending of the strain producing body 13. This generates a gauge voltage corresponding to the degree of the strain. The gauge voltage basically changes in a linear manner in accordance with the load applied to the seat 1. The signal processing device 16 is connected to the strain gauge 15, and acquires the load information corresponding to the load applied to the seat 1 based on the gauge voltage. More specifically, the signal processing device 16 includes various analog circuits and digital circuits. The gauge voltage is A/D (analog/digital) converted and the result is written and stored as the load information in a memory of the signal processing device. The most recent load information is updated and stored in the memory of the signal processing device 16 in accordance with the acquisition timing of the load information.

An electronic control unit (hereinafter referred to as the ECU) 20 is supported in the lower arm 7. The signal processing device 16 of the load sensor 14 in all (four) of the sensor units 6 is connected to the ECU 20 by a signal line 21 so as to enable bi-directional communication. The ECU 20 receives from each load sensor 14 load information signal including the load information acquired by the load sensor 14 to perform passenger determination etc.

The electrical structure of the ECU 20 in the present embodiment will now be described with reference to FIG. 2. In the following description, the load sensors 14 arranged at the right front side and the right rear side when facing the front of the vehicle are referred to as first and second load sensors 14a and 14b and the load sensors 14 arranged on the left front side and the left rear side are referred to as third and fourth load sensors 14c and 14d.

Figure 2:
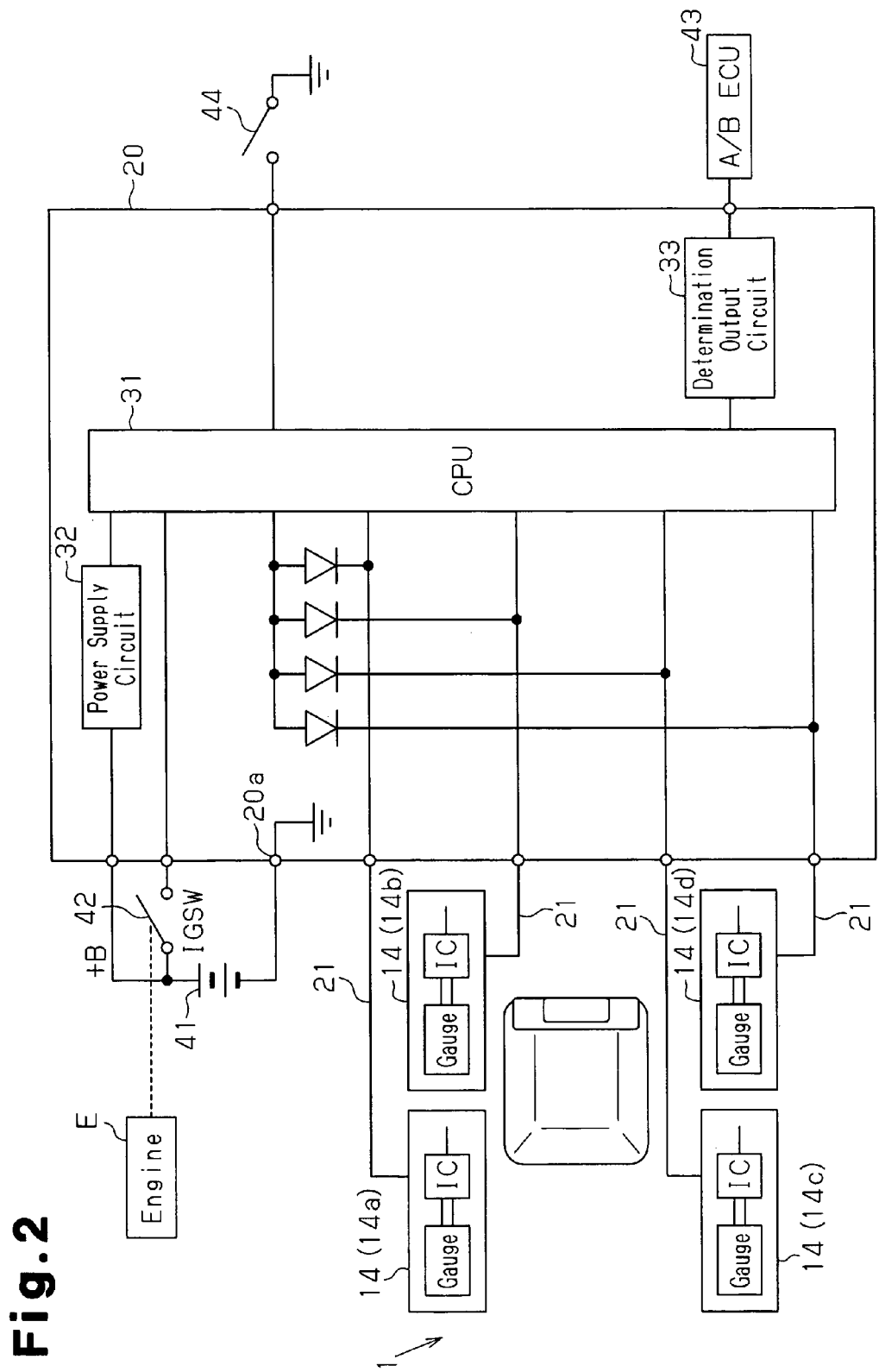
FIG. 2 is a block diagram showing the electrical structure of the ECU.

As shown in FIG. 2, the ECU 20 includes a central processing unit (hereinafter referred to as CPU), a power supply circuit 32, and a determination output circuit 33. Although not particularly shown in the drawings, the ECU 20 includes an ROM storing various programs and maps etc. and a RAM (random access memory) in which various data etc. is readable and writable, and a re-writable non-volatile memory such as an EEPROM (Electrically Erasable Programmable ROM). The CPU 31 is connected to the signal processing devices 16 of the first to the fourth load sensors 14a to 14d by the signal line 21.

The CPU 31 is connected to a positive terminal of an on-vehicle battery 41, or the external power supply, via the power supply circuit 32. Power supply voltage Vcc having a predetermined level (e.g., 5 V) generated by the power supply circuit 32 is supplied to the CPU 31. A negative terminal of the on-vehicle battery 41 is connected to a ground terminal 20a of the ECU 20.

The CPU 31 is connected to an ignition switch 42 of the vehicle and to the positive terminal of the on-vehicle battery 41 via the ignition switch 42. The CPU 31 determines the ON/OFF state of the ignition switch 42 based on the signal level from the ignition switch 42, which serves as a first switch. When the ignition switch 42 is switched from the OFF state to the ON state, the engine E of the vehicle is ignited to start the engine E. Therefore, the ignition switch 42 functions as a switch that changes states when starting the engine E and also functions as a switch for detecting a change in the ignition state of the engine E.

The ECU 20 is not only connected to the on-vehicle battery 41 via the ignition switch 42 but also directly connected to the on-vehicle battery 41. Thus, the operating state of the ECU 20 may be maintained even if the ignition switch 42 is in the OFF state.

Furthermore, the CPU 31 is connected to a seat belt switch 44 serving as a second switch. The CPU 31 determines the ON/OFF state of the seat belt switch 44 based on the signal level from the seat belt switch 44. The seat belt switch 44 detects the fastening state of the seat belt (not shown) and is in an ON state when the seat belt is fastened and in an OFF state when the seat belt is unfastened. In other words, the seat belt switch 44 detects changes in the fastening state of the seat belt.

The CPU 31 is also connected via the determination output circuit 33 to an air bag ECU 43 for controlling an air bag (not shown) arranged in the vehicle. The CPU 31 outputs various determination information to the air bag ECU 43 via the determination output circuit 33.

Figure 3:
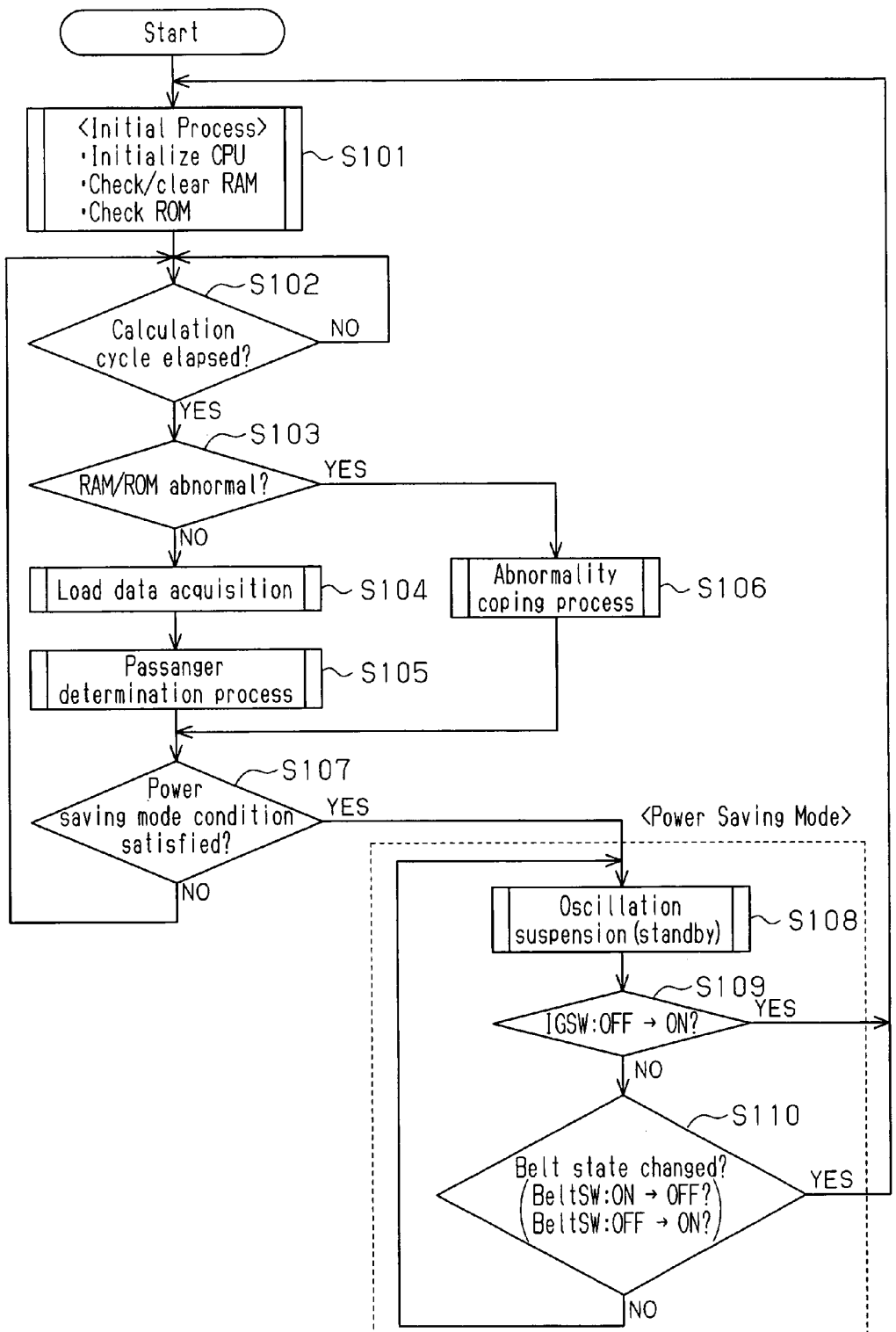
FIG. 3 is a flowchart showing passenger determination procedures executed by the ECU.

The passenger determining procedures executed by the CPU 31 will now be described with reference to the flowchart of FIG. 3. The flowchart of FIG. 3 includes processes executed when the on-vehicle battery 41 is connected to the ECU 20 and the ECU 20 starts being supplied with power. More specifically, when the process of the CPU 31 proceeds to the routine illustrated in the flowchart of FIG. 3 for the first time as the ECU 20 starts being supplied with power, in step S101, the CPU 31 undergoes an initial process to check the operation of the CPU 31. Specifically, the CPU 31 initializes itself, checks and clears the RAM, checks the ROM, and so on.

The CPU 31 then waits for a predetermined calculation period to elapse in step S102 before proceeding to step S103. In step S103, the CPU 31 determines whether or not there was an abnormality in the RAM or ROM during the initial process. When determining that there is no abnormality in the RAM or ROM, the CPU 31 performs a load data acquisition process in step S104. Specifically, the CPU 31 outputs an information request signal to the signal processing device 16 of each load sensor 14a to 14d via the signal line 21. When receiving the information request signal from the CPU 31, each signal processing device 16 reads the load information stored in its memory, processes the load information according to a predetermined transmission format to generate a load information signal, and transmits the load information signal to the CPU 31. The CPU 31 acquires the load information contained in the load information signal received from each of the load sensors 14a to 14d.

In step S105, the CPU 31 executes a predetermined calculation based on the acquired load information and performs a passenger determination process. Specifically, the CPU 31 determines whether or not the seat 1 is vacant, whether an adult or a child is sitting on the seat 1, and so on.

When determining that there is an abnormality in the RAM or ROM in step S103, the CPU 31 performs an abnormality coping process in step S106. More specifically, the CPU 31 lights an indicator (not shown) arranged in the vehicle and the like. The user (driver etc.) is thus notified of the abnormality in the ECU 20 and urged to take an immediate measure such as going to a garage.

After the step S105 or step S106 is performed, the CPU 31 proceeds to step S107 and determines whether or not power saving mode conditions are satisfied. The power saving mode is an operation mode for suppressing power consumption when the ignition switch 42 is in the OFF state, and the conditions required to be satisfied are the ignition switch 42 being in the OFF state and the ECU 20 being in a state in which it can be deactivated. The state in which the ECU 20 can be deactivated refers to in which the CPU 31 is not in the process of executing a control. The operation mode of the ECU 20 includes the power saving mode and a normal mode other than the power saving mode. The processes of steps S101 to S107 are the processes performed under the normal mode.

When determining that the power saving mode conditions are not satisfied, the CPU 31 returns to step S102 and repeats the processes of steps S102 to S107. When determining that the power saving mode conditions are satisfied, the CPU 31 proceeds to step S108 and performs an oscillation suspension process (standby process). That is, the CPU 31 suspends oscillation of its oscillator and causes a predetermined interruption port to function.

The CPU 31 then proceeds to step S109 and determines whether or not the ignition switch 42 has switched from the OFF state to the ON state. When determining that the ignition switch 42 has not switched from the OFF state to the ON state, it is assumed that the vehicle engine E has not been started. In this case, the CPU 31 proceeds to step S110, and determines whether or not the state (fastened and unfastened states) of the seat belt has changed. Specifically, the CPU 31 determines whether or not the seat belt switch 44 has changed from an ON state to an OFF state or from an OFF state to an ON state. The changing from an ON state to an OFF state of the seat belt switch 44 indicates that the seat belt has been unfastened because the passenger is exiting the vehicle, because a child seat is being removed, or because of other reasons. The changing from an OFF state to an ON state of the seat belt switch 44 indicates that the seat belt has been fastened because the passenger has entered the vehicle, because a child seat has been attached, and because of other reasons. When determining that the state of the seat belt has not changed in step S110, it is assumed that, for example, the passenger is not entering or exiting the vehicle. In this case, the CPU 31 returns to step S108 and continues the power saving mode.

When determining that the ignition switch 42 is switched from the OFF state to the ON state in step S109, it may be assumed that the engine E has been started. In this case, the CPU 31 proceeds to step S101 and executes the above initial process. When determining that the state of the seat belt has changed in step S110, it is assumed that, for example, the passenger is entering or exiting the vehicle. In this case, the CPU 31 proceeds to step S101 and executes the above described initial process.

As described above, in the present embodiment, processing similar to the processing executed when the ECU 20 is initially activated, that is, the initial process of the CPU 31, is executed whenever the engine E is started, whenever the passenger enters or exits the vehicle, and so on. This increases the frequency the initial process is performed and improves the reliability of the CPU 31.

The CPU 31 sends the passenger determination information and the abnormality information of the RAM and ROM to the air bag ECU 43 via the determination output circuit 33.

The air bag ECU 43 optimally controls the operation of the air bag based on the acquired passenger determination information and the abnormality information.

The present embodiment described above in detail has the advantages described below.

(1) In the present embodiment, the initial process of the CPU 31 is performed whenever the operation mode of the ECU 20 is switched from the power saving mode to the normal mode, that is, whenever the engine E is started and whenever the seat belt is fastened or unfastened so that when the passenger enters or exits the vehicle. Therefore, the initial process is performed in relatively short time intervals. This improves the reliability of the CPU 31.

(2) In the present embodiment, the ECU 20 is switched from the power saving mode to the normal mode, for example, when the ignition switch 42 is switched from an OFF state to an ON state to start the engine E of the vehicle. Then, the CPU 31 undergoes the initial process. The initial process is thus executed at an appropriate timing.

(3) In the present embodiment, the initial process of the CPU 31 is performed whenever the ECU 20 is switched from the power saving mode to the normal mode, such as when the seat belt switch 44 is switched from an OFF state to an ON state due to the fastening of the seat belt as the passenger enters the vehicle or when the seat belt switch 44 is switched from the ON state to the OFF state due to the unfastening of the seat belt when the passenger exits the vehicle. The initial process is thus executed at an appropriate timing.

The above embodiment may be modified as described below.

In the above embodiment, the initial process may be executed irrespective of the power saving mode based on changes in the ignition switch 42 from the OFF state to the ON state or from the ON state to the OFF state (for example, when stopping the engine E). In this case, the initial process of the CPU 31 is still performed whenever the ignition switch 42 is switched from the OFF state to the ON state or from the ON state to the OFF state when starting or stopping the engine E. This improves the reliability of the CPU 31.

In the above embodiment, the elapsed time from the previous initial process may be managed by the CPU 31, and the next initial process may be performed whenever a predetermined constant time elapses.

In the above embodiment, the number of load sensors 14 is not limited to four, and may be any natural number.

In the above embodiment, the strain gauge 15 may be adhered to the lower surface of the flexible portion 13a.

The structure of the illustrated sensor unit 6 is merely an example. Other structures may be adopted for the sensor unit 6 as long as the load applied to the seat 1 can be detected.

In the above embodiment, the ECU 20 does not have to be the load detecting ECU. In short, it merely needs to be a vehicle ECU maintained in an operating state by power supplied from the on-vehicle battery 41 when the ignition switch 42 is in an OFF state.

The invention claimed is:

1. A vehicle electronic control unit supplied with power from a battery mounted on a vehicle, the vehicle electronic control unit comprising:
 a central processing unit supplied with power from the battery and operable in operation modes including a normal mode and a power saving mode;
 a RAM;
 a seat belt switch for detecting a fastening state of a seat belt in the vehicle; and
 wherein the central processing unit undergoes an initial process when the power saving mode changes to the normal mode, the central processing unit changing from the power saving mode to the normal mode in response to at least one of a change in the seat belt switch from an OFF state to an ON state and a change in the seat belt switch from an ON state to an OFF state, the initial process including at least one of initializing the central processing unit and clearing the RAM.

2. The vehicle electronic control unit according to claim 1, wherein the central processing unit changes from the power saving mode to the normal mode in response to a change in an ignition switch of the vehicle from an OFF state to an ON state.

3. The vehicle electronic control unit according to claim 1, wherein the central processing unit changes from the normal mode to the power saving mode in response to a change in an ignition switch of the vehicle from an ON state to an OFF state.

4. A vehicle electronic control unit supplied with power from a battery mounted on a vehicle, the vehicle electronic control unit comprising:
a central processing unit supplied with power from the battery and operable in operation modes including a normal mode and a power saving mode;
a RAM; and
a first switch for changing states when starting an engine of the vehicle, and a second switch for detecting fastening and unfastening of a seat belt in the vehicle, wherein the central processing unit undergoes an initial process when the power saving mode changes to the normal mode, the central processing unit changing from the power saving mode to the normal mode in response to an output from the first switch and a change in a detection result of the second switch, the initial process including at least one of initializing the central processing unit and clearing the RAM.

5. The vehicle electronic control unit according to claim 4, wherein the first switch is an ignition switch and the second switch is a seat belt switch.

6. A vehicle electronic control unit for connection to an external power supply, the vehicle electronic control unit comprising:
a central processing unit supplied with power from the external power supply and operable in operation modes including a normal mode and a power saving mode for suppressing power consumption of the central processing unit;
a RAM; and
wherein the central processing unit undergoes an initial process when the power saving mode changes to the normal mode, the central processing unit changing from the power saving mode to the normal mode when a fastening state of a seat belt in the vehicle changes during operation in the power saving mode, the initial process including at least one of initializing the central processing unit and clearing the RAM.

7. The vehicle electronic control unit according to claim 6, wherein:

the central processing unit changes from the power saving mode to the normal mode when an ignition state of an engine of the vehicle changes during operation in the power saving mode.

8. The vehicle electronic control unit according to claim 7, wherein:
an ignition switch detects the ignition state of the engine; and
a seat belt switch detects the fastening state of the seat belt.

9. The vehicle electronic control unit according to claim 1, wherein the central processing unit is operated in the power saving mode when an ignition switch of the vehicle from an OFF state.

10. The vehicle electronic control unit according to claim 9, wherein the central processing unit is operated in the power saving mode when the central processing unit is not in the process of executing a control.

11. The vehicle electronic control unit according to claim 4, wherein the first switch is an ignition switch, and the central processing unit is operated in the power saving mode when the ignition switch is an OFF state.

12. The vehicle electronic control unit according to claim 11, wherein the central processing unit is operated in the power saving mode when the central processing unit is not in the process of executing a control.

13. The vehicle electronic control unit according to claim 6, wherein the central processing unit is operated in the power saving mode when an ignition switch of the vehicle from an OFF state.

14. The vehicle electronic control unit according to claim 13, wherein the central processing unit is operated in the power saving mode when the central processing unit is not in the process of executing a control.

15. The vehicle electronic control unit according to claim 2, further comprising a ROM, wherein the initial process further includes checking whether there is an abnormality in the RAM and checking whether there is an abnormality in the ROM.

16. The vehicle electronic control unit according to claim 4, further comprising a ROM, wherein the initial process further includes checking whether there is an abnormality in the RAM and checking whether there is an abnormality in the ROM.

17. The vehicle electronic control unit according to claim 6, further comprising a ROM, wherein the initial process further includes checking whether there is an abnormality in the RAM and checking whether there is an abnormality in the ROM.

18. The vehicle electronic control unit according to claim 1, wherein the initial process includes both initializing the central processing unit and clearing the RAM.

19. The vehicle electronic control unit according to claim 4, wherein the initial process includes both initializing the central processing unit and clearing the RAM.

20. The vehicle electronic control unit according to claim 6, wherein the initial process includes both initializing the central processing unit and clearing the RAM.

\* \* \* \* \*